United States Patent Office 3,705,115
Patented Dec. 5, 1972

3,705,115
GLYCIDYL ETHERS OF GLYCERINE-CONTAINING POLYHYDROXYL COMPOUNDS
James L. Bertram, Lake Jackson, and David O. Bowen, Freeport, Tex., assignors to The Dow Chemical Company, Midland, Mich.
No Drawing. Filed Aug. 26, 1970, Ser. No. 67,232
Int. Cl. C08g 30/16
U.S. Cl. 260—2 EP          8 Claims

ABSTRACT OF THE DISCLOSURE

The physical properties of glycidyl ethers of glycerine are improved by blending a polyhydroxyl-containing compound, such as glycerine, with said glycidyl ether in proportions such that the ratio of epoxide equivalents to hydroxyl equivalent in the blend is in the range of from about 1.8:1 to about 0.5:1. When such blends are cured with catalytic quantities of a curing agent, such as a tertiary amine, one or more of the physical properties such as tensile strength, percent elongation and tensile modulus are improved.

---

This invention relates to polyglycidyl ethers of glycerine compositions containing polyhydroxyl compounds and thermoset products obtained therefrom.

Glycidyl ethers of glycerine are known in the art. However, their properties when cured with catalytic quantities of a tertiary amine or Lewis acid complex and the like, are somewhat less than desirable, especially the physical properties including tensile strength, elongation and tensile modulus.

It has now been unexpectedly discovered that one or more of the physical properties including tensile strength, elongation and tensile modulus of glycidyl ethers of glycerine can be improved by the addition of a compound containing from about 2 to about 8 aliphatic or aromatic hydroxyl groups.

The compositions contemplated by the present invention include those thermosettable compositions comprising (a) a polyglycidyl ether of glycerine having an epoxide

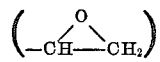

equivalent per hydroxyl (OH) equivalent above about 2.0, and (b) a sufficient quantity of a compound containing from about 2 to about 8 aliphatic or aromatic hydroxyl groups to adjust the epoxide equivalent per hydroxyl equivalent ratio of the resultant composition to within the range of from about 1.8:1 to about 0.5:1 and preferably from about 1.3:1 to about 0.60:1.

The physical properties of polyglycidyl ethers of glycerine compositions when cured with tertiary amines or Lewis acid complex catalysts cannot be significantly improved by the present invention when the glycidyl ether of glycerine possesses an epoxide equivalent to hydroxyl equivalent ratio of less than about 0.7:1. When the quantity of polyhydroxyl-containing material added is sufficient to cause the epoxide equivalent to hydroxyl equivalent ratio of the composition to be less than about 0.5:1 there is not observed any significant improvement in properties and oftentimes the physical properties are actually less than the unmodified polyglycidyl ethers of glycerine.

Any polyglycidyl ether of glycerine which has an epoxide equivalent to hydroxyl equivalent greater than about 0.8:1 can be improved by the present invention and includes the polyglycidyl ethers of glycerine, including mixtures of such ethers represented by the general formula

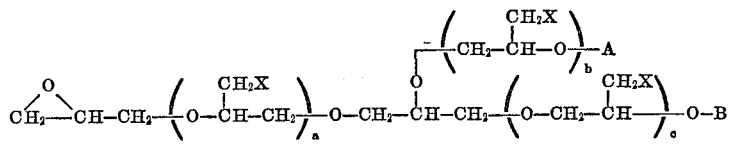

wherein A and B are independently selected from the group consisting of hydrogen and

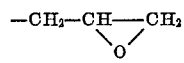

radical, each X is independently a halogen having an atomic number of from 17 to 53 inclusive and $a$, $b$ and $c$ are integers the sum of which equals a number from about 0 to about 10, preferably from about 0 to about 5.

The glycidyl ethers of glycerine, the properties of which can be improved by the present invention, may be water soluble or water insoluble and includes those water soluble resins taught in a copending application Ser. No. 67,234 filed Aug. 26, 1970 by James L. Bertram and Pong Su Shih.

Other polyglycidyl ethers of glycerine whose properties can be improved by the present invention include those taught in a copending application Ser. No. 71,288 filed Aug. 26, 1970 by James L. Bertram and David O. Bowen.

So much of the above copending applications as pertains to glycidyl ethers of glycerine and methods for their preparation are incorporated herein by reference.

Among the suitable compounds which may be employed according to this invention to improve the physical properties are the aliphatic hydroxyl-containing compounds having from about 2 to about 8 hydroxyl groups which include for example, glycols and halogenated glycols having from about 2 to about 10 carbon atoms such as, for example, ethylene glycol, butylene glycol, propylene glycol, neopentyl glycol, dibromoneopentyl glycol, dihydroxycyclohexane and the like; trihydroxyl containing compounds such as, glycerine, trimethylol propane, hexane triol and the like; and other polyhydroxyl containing compounds such as, for example, pentaerythritol, sorbitol, sucrose, α-methyl glucoside, and the like and mixtures of any of the above compounds.

Polyoxyalkylene glycols having a molecular weight in the range from about 200 to about 600 such as, for example, the polyoxyethylene glycols, polyoxypropylene glycols and the like, may also be employed as the polyhydroxyl-containing compounds as well as polyglycerol having a molecular weight of from about 165 to about 1000.

Among the aromatic hydroxyl compounds which can be employed in the present invention are the dihydroxy benzenes such as, resorcinol, catechol, hydroquinone, and the like; bisphenol compounds including those represented by the general formula

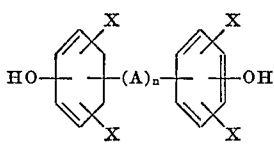

wherein A is selected from the group consisting of a divalent hydrocarbon radical containing from about 1 to about 8 carbon atoms, —S—, —S—S—,

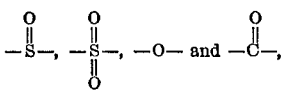

each X is independently selected from hydrogen, chlorine or bromine and n has a value of zero or 1; the hydrogenated derivatives of the above compounds, the oxyalkylated derivatives of the above compounds and mixtures of any of the above.

Other suitable polyhydroxy containing compounds in include the hydrolyzed diglycidyl ethers of a polyhydric phenol represented by the general formulae

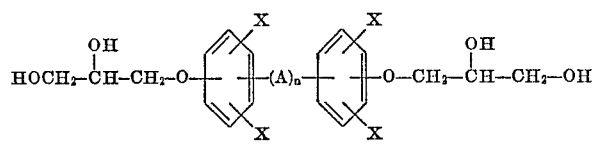

wherein X, A and n are as previously defined; and

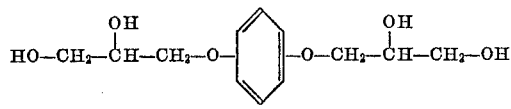

The particular polyhydroxyl-containing compound employed is not particularly important except as a means for adjusting the epoxide to hydroxyl ratio of the compositions described herein to the proper value, also previously described.

The catalytic curing agents which may be employed in composition of the present invention include the tertiary amines, Lewis acid complexes and the like. Suitable such catalytic curing agents include, for example, tridimethyl aminomethyl phenol, benzyldimethylamine, dimethyl aminomethyl phenol, alphamethylbenzyl dimethylamine, dicyandiamide, boronitrifluoride-monoethylamine complex, mixtures thereof and the like.

The above catalysts for promoting the curing of the compositions of the present invention are employed in catalytic quantities ranging from about 0.1 to about 10 parts of catalyst per 100 parts of catalyst plus polyglycidyl ether of glycerine and polyhydroxyl-containing compounds.

The compositions of the present invention may be modified with various fillers, extenders, promoters and the like to render such compositions more suitable for particular end use applications such as adhesives, coatings, castings and the like.

The compositions of the present invention are particularly suitable for use in adhesive formulations.

EXAMPLE 1

(A) Preparation of polyglycidyl ether of glycerine Resin A

A reaction vessel was employed which was fitted with a temperature indicator, a stirrer and a condenser attached to a separating device for the aqueous and organic layers. Into such vessel was added 1500 lbs. glycerine, 6,570 lbs. ethylene dichloride and 75 lbs. BF₃ etherate. After heating such mixture to 55-60° C., 3,730 lbs. of epichlorohydrin containing 274 lbs. of a diglycidyl ether of glycerine resin having a percent epoxide of 24.4, a percent OH of 7.5, a total chloride of 8.6 and a percent hydrolyzable chloride of 0.24, was added over a period of about 6 hours while maintaining the 55-60° C. temperature. After the epichlorohydrin addition was complete, the solution was digested at 60° C. for 30 minutes after which the temperature was increased to 83° C.-86° C. and 2860 lbs. of 50 weight percent aqueous NaOH was slowly added thereto over a period of about 6 to 8 hours while maintaining the temperature. During the NaOH addition, water was continuously removed from the reaction vessel as an azeotrope with EDC. The water was separated from the condensed azeotrope and the solvent returned to the reaction vessel. Heating and distillation was continued until no more water distilled from the reaction mixture. The reaction mixture was then allowed to cool, the salt was removed by filtration, and the product was recovered by flashing the EDC solvent therefrom.

The product was a colorless liquid having a percent epoxide of 27.6, a percent hydrolyzable chloride of 0.36, a percent hydroxyl of 7.2, a percent total chloride of 9.7 and a ratio of epoxy equivalents to hydroxyl equivalents of 1.5:1.

(B) Blends of Resin A with various hydroxyl-containing compounds

Portions of the above prepared polyglycidyl ether of glycerine Resin A was blended with various hydroxyl-containing compounds and in some instances various proportions of the hydroxyl-containing compound. These blends were then cured with 4 parts by weight of 2,4,6-tris(dimethylaminomethyl)phenol based upon 100 parts by weight (phr.) of the blend of the polyglycidyl ether of glycerine and the polyhydroxyl-containing compound. The type and quantities of the polyhydroxyl-containing compound and the resultant properties of the cured mixture are given in the following Table I.

TABLE I

| Experiment Number | Ratio of epoxide equivalent to hydroxyl equivalents of the blend of Resin A and polyhydroxyl-containing compound | Polyhydroxyl-containing compound employed | | Physical properties of cured products [3] | | |
|---|---|---|---|---|---|---|
| | | Type | Quantity as percent of total blend | Tensile strength, p.s.i. | Percent elongation | Tensile modulus, p.s.i. |
| 1 | 1.5:1 | None | None | 50 | 10 | 167 |
| 2 | 1.04:1 | Glycerine | 5 | 80 | 9.6 | 284 |
| 3 | 0.801:1 | do | 7.5 | 97 | 8.8 | 324 |
| 4 | 0.710:1 | do | 10.0 | 164 | 16 | 340 |
| 5 | 0.690:1 | do | 12.5 | 143 | 13.2 | 351 |
| 6 | 0.635:1 | do | 15.0 | 112 | 11.4 | 311 |
| 7 | 0.516:1 | do | 20.0 | 89 | 18.8 | 172 |
| 8 | 0.895:1 | Propylene glycol | 10.0 | 66 | 10 | 209 |
| 9 | 0.954:1 | Trimethylol propane | 10 | 128 | 14 | 277 |
| 10 | 1.31:1 | (¹) | 10 | 85 | 15.4 | 199 |
| 11 | 1.30:1 | Hyrdolyzed DER 331 [2] | 5 | 101 | 13 | 243 |
| 12 | 1.21:1 | do.[3] | 10 | 164 | 19.8 | 306 |
| 13 | 1.06:1 | do.[3] | 15 | 198 | 20 | 375 |

[1] The reaction product of p,p'-isopropylidine diphenol with 2 moles of propylene oxide having an OH equivalent weight of 198 and represented by the general formula

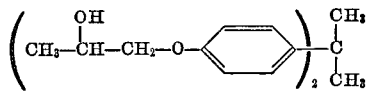

[2] The hydrolyzed product of the diglycidyl ether of p,p'-isopropylidine diphenol having an OH equivalent weight of 104 and represented by the general formula

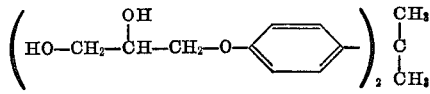

[3] The specimens were cured at 250° F. for 3 hours before testing.

EXAMPLE 2

(A) Preparation of polyglycidyl ether of glycerine Resin B

A reaction vessel was employed which was fitted with a temperature indicator, a stirrer and a condenser attached to a separating device for the aqueous and organic layers. Into such flask was added 92.1 gm. of glycerine, 368 gm. ethylene dichloride and 4.26 gm. $BF_3$ etherate. After heating such mixture to 55–60° C., 240.5 gms. of epichlorohydrin was added over a period of between about 15 minutes and 6 hours while maintaining the 55–60° C. temperature. After the epichlorohydrin addition was complete, the solution was digested at 60° C. for 30 minutes after which the temperature was increased to 83° C.–86° C. and 177 gm. of 50 weight percent aqueous NaOH was slowly added thereto over a period of from 30 minutes to 8 hours while maintaining the temperature. During the NaOH addition, water was continuously removed from the reaction vessel as an azeotrope with EDC. The water was separated from the condensed azeotrope and the solvent returned to the reaction vessel. Heating and distillation continued for about 15 minutes until no more water distilled from the reaction mixture. The reaction mixture was then allowed to cool, the salt was removed by filtration, and the product was recovered by flashing the EDC solvent therefrom.

The product was a colorless liquid having a percent epoxide of 30.1, a percent hydrolyzable chloride of 0.051, a percent total chloride of 5.66 and a ratio of epoxy equivalents to hydroxyl equivalents of 2.10:1.

(B) Blends of Resin B with various hydroxyl-containing compounds

Portions of the above prepared polyglycidyl ether of glycerine Resin B were blended with various hydroxyl-containing compounds and in some instances various proportions of the hydroxyl-containing compound. These blends were then cured with 4 parts by weight of 2,4,6-tris(dimethylaminomethyl)phenol based upon 100 parts by weight (phr.) of the blend of the polyglycidyl ether of glycerine and the polyhydroxyl-containing compound. The type and quantities of the polyhydroxyl-containing compound and the resultant properties of the cured mixture are given in the following Table II.

TABLE II

| Experiment number | Ratio of epoxide equivalent to hydroxyl equivalents of the blend of Resin B and polyhydroxyl-containing compound | Polyhydroxyl-containing compound employed | | Physical properties of cured product | | |
|---|---|---|---|---|---|---|
| | | Type | Quantity as percent of total blend | Tensile strength, p.s.i. | Percent elongation | Tensile modulus, p.s.i. |
| 1[1] | 2.08:1 | None | None | 15 | 6 | 75 |
| 2 | 0.994:1 | Glycerine | 10.0 | 104 | 14.4 | 253 |
| 3 | 0.890:1 | do | 12.5 | 106 | 14.4 | 250 |
| 4 | 0.772:1 | do | 15.0 | 75 | 14.8 | 164 |
| 5 | 1.82 | Hydrolyzed DER 331 [2] | 5.0 | 41 | 9.0 | 154 |
| 6 | 1.59 | do | 10.0 | 92 | 14.0 | 210 |
| 7 | 1.37 | do | 15.0 | 136 | 18.8 | 247 |

[1] A resin prepared in an identical manner as Resin B having a percent epoxide of 29.9, a percent hydrolyzable chloride of 0.051, a percent hydroxyl of 5.7, a percent total chloride of 5.66 and a ratio of epoxy equivalents per OH equivalent of 2.08:1.
[2] Described following Table I.

We claim:
1. A thermosettable epoxy resin composition which comprises
(a) a composition which comprises a mixture of
  (1) a polyglycidyl ether of glycerine having an epoxide equivalent to hydroxyl equivalent ratio greater than about 0.8:1 and
  (2) a sufficient quantity of a polyhydroxyl containing compound to adjust the epoxide equivalent to hydroxyl equivalent ratio of the mixture to within the range of from about 1.8:1 to about 0.5:1 and
(b) from about 0.1 to about 10 parts by weight per 100 parts by weight of the combined weight of (a) and (b) of a catalyst selected from a tertiary amine or Lewis acid complex.

2. The composition of claim 1 wherein the epoxide equivalent to hydroxyl equivalent ratio is adjusted to within the range of from about 1.3:1 to about 0.6:1.

3. The composition of claim 2 wherein the polyhydroxyl-containing compound is an aliphatic hydroxyl-containing compound containing from about 2 to about 8 carbon atoms.

4. The composition of claim 3 wherein the polyhydroxyl-containing compound is selected from glycerine and trimethylol propane.

5. The composition of claim 2 wherein the hydroxyl-containing compound is an aromatic hydroxyl-containing compound.

6. The composition of claim 5 wherein the hydroxyl-containing compound is a hydrolyzed diglycidyl ether of a bisphenol.

7. The composition of claim 2 wherein component (b) is a tertiary amine.

8. The composition of claim 7 wherein the tertiary amine is 2,4,6-tris(dimethylaminomethyl)phenol.

References Cited
UNITED STATES PATENTS

| | | | |
|---|---|---|---|
| 3,240,376 | 3/1966 | Smith et al. | 260—47 |
| 3,405,093 | 10/1968 | Walker | 260—47 |
| 3,446,756 | 5/1969 | Ramos | 260—2 |

WILLIAM H. SHORT, Primary Examiner

T. E. PERTILLA, Assistant Examiner

U.S. Cl. X.R.

117—161 ZB; 260—47 EP, 47 EN